(12) United States Patent
Pathuvoth et al.

(10) Patent No.: US 12,258,939 B2
(45) Date of Patent: Mar. 25, 2025

(54) SYSTEM AND METHOD FOR MONITORING DAMAGE OF A BEARING FOR A WIND TURBINE

(71) Applicant: General Electric Renovables Espana, S.L., Barcelona (ES)

(72) Inventors: Dhanesh Chandrashekar Pathuvoth, Bengaluru (IN); Vidyashankar Ramasastry Buravalla, Bengaluru (IN)

(73) Assignee: General Electric Renovables Espana, S.L., Barcelona (ES)

( * ) Notice: Subject to any disclaimer, the term of this patent is extended or adjusted under 35 U.S.C. 154(b) by 223 days.

(21) Appl. No.: 18/083,720

(22) Filed: Dec. 19, 2022

(65) Prior Publication Data

US 2024/0200535 A1    Jun. 20, 2024

(51) Int. Cl.
*F03D 17/00* (2016.01)
*F03D 80/70* (2016.01)

(52) U.S. Cl.
CPC ........... *F03D 17/013* (2023.08); *F03D 17/00* (2016.05); *F03D 80/70* (2016.05)

(58) Field of Classification Search
CPC .................................. F03D 17/00; F03D 17/32
See application file for complete search history.

(56) References Cited

U.S. PATENT DOCUMENTS

| | | | |
|---|---|---|---|
| 8,463,085 B2 | 6/2013 | Cribbs | |
| 9,442,004 B2 | 9/2016 | Glavind et al. | |
| 10,151,667 B2 | 12/2018 | Hodac | |
| 10,273,940 B2 | 4/2019 | Pan et al. | |
| 10,378,515 B2 * | 8/2019 | Kibsgaard | F03D 7/0224 |
| 10,422,321 B2 | 9/2019 | Muller et al. | |
| 11,215,447 B2 * | 1/2022 | Nawrot | G01L 1/246 |
| 2010/0232963 A1 | 9/2010 | Volanthen et al. | |
| 2011/0135476 A1 | 6/2011 | Olesen | |

(Continued)

FOREIGN PATENT DOCUMENTS

| | | |
|---|---|---|
| CN | 103314277 A | 9/2013 |
| EP | 2466131 A2 | 6/2012 |
| JP | 2022/168865 A | 11/2022 |

OTHER PUBLICATIONS

Durham/ Instruments, Optical Strain Sensors, 9 Pages. Retrieved Aug. 26, 2022 from weblink: https://disensors.com/products/optical-strain-sensors/.

(Continued)

*Primary Examiner* — Brian P Wolcott
*Assistant Examiner* — John S Hunter, Jr.
(74) *Attorney, Agent, or Firm* — Dority & Manning, P.A.

(57) ABSTRACT

A method for monitoring damage of a slewing ring bearing of a wind turbine includes arranging at least one optical fiber sensor adjacent to or at least partially on at least one of an inner race or an outer race of the slewing ring bearing. Further, the method includes receiving, via a controller, signals from the at least one optical fiber sensor indicative of one or more changes associated with the slewing ring bearing. The method also includes comparing, via the controller, the one or more changes associated with the slewing ring bearing to a damage threshold. Moreover, the method includes implementing, via the controller, a control action when the one or more changes exceeds the damage threshold to prevent or minimize further damage from occurring to the slewing ring bearing.

16 Claims, 8 Drawing Sheets

(56) References Cited

U.S. PATENT DOCUMENTS

2016/0123304 A1    5/2016   Kibsgaard et al.
2020/0056586 A1    2/2020   Ehlers et al.
2020/0326251 A1    10/2020  Guo et al.

OTHER PUBLICATIONS

Glisic et al., Development of Method for In-Service Crack Detection Based on Distributed Fiber Optic Sensors, Sage Journals, vol. 11, Issue 2, 2011, pp. 161-171. (Abstract Only). https://journals.sagepub.com/doi/abs/10.1177/1475921711414233.
Hottinger et al., AZO Sensors, Monitoring Pipeline Integrity with Fiber Optic Strain Sensors, Apr. 22, 2015, 6 Pages. https://www.azosensors.com/article.aspx?ArticleID=602.
Johnson, Sensorland, Fibre Optic Sensors based on Fibre Bragg Gratings, 5 Pages. Retrieved Aug. 26, 2022 from weblink: https://www.sensorland.com/HowPage110.html.
Lunainc, os3150_3155 image, 1 Page. Retrieved Aug. 26, 2022 from weblink https://lunainc.com/sites/default/files/styles/image_497/public/assets/images/products/os3150_3155.png?itok=_vJ_LFj-.
European Search Report Corresponding to EP23218177 on Apr. 26, 2024.

\* cited by examiner

SYSTEM AND METHOD FOR MONITORING DAMAGE OF A BEARING FOR A WIND TURBINE

FIELD

The present disclosure relates generally to wind turbines, and more particularly, to systems and methods for monitoring bearings and the components engaged to and/or adjacent to the bearings of wind turbines for damage.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades engaged to the nacelle via a rotor hub. The rotor blades capture kinetic energy from wind using known airfoil principles and transmit the kinetic energy through rotational energy to turn the rotor hub. The rotating rotor hub turns a shaft coupling the rotor hub to a gearbox, or if a gearbox is not used, directly to the generator. The generator then converts the mechanical energy to electrical energy that may be deployed to a utility grid.

Some wind turbines have large components (e.g., long rotor blades) to help the wind turbines produce more electrical energy. However, the larger components often subject the other components of the wind turbines to increased loads (e.g., asymmetric loads). The asymmetric loads associated with long rotor blades, for example, may be the result of changing wind conditions, yaw misalignment, pitch misalignment, etc., and the asymmetric loads may cause strain or damage to the other component(s) engaged to the long rotor blades (e.g. a pitch bearing) and/or to adjacent structures (e.g., the structure(s) adjacent to a pitch bearing at the interface of each rotor blade and the rotor hub, such as, a blade root of each rotor blade and/or a hub body of the rotor hub).

For example, a bearing (such as a pitch bearing or a yaw bearing of a wind turbine) regularly experiences one or more loads. The load(s) may be the result of average loading, due to wind turbine operation, and dynamically fluctuating loading, due to changing environmental conditions. As such, the load(s) can cause strain or damage to the other component(s) engaged to and/or adjacent to the bearing(s) of the wind turbine. In worse case scenarios, excessive strain and/or damage can cause the bearing(s) to fail. For example, a failure of a pitch bearing can force the wind turbine to be shut down and repaired. Therefore, wind turbine operators can incur substantial losses due to the downtime of a wind turbine.

In view of the aforementioned, there is a need for systems and methods for monitoring bearings, and/or the components engaged to and/or adjacent to the bearings, that can provide an early warning signal regarding associated damage.

BRIEF DESCRIPTION

Aspects and advantages of the present disclosure will be set forth in part in the following description, or may be obvious from the description, or may be learned through practice of the present disclosure.

In one aspect, the present disclosure is directed to a method for monitoring damage of a slewing ring bearing of a wind turbine. Embodiments of the method include arranging at least one optical fiber sensor adjacent to or at least partially on at least one of an inner race or an outer race of the slewing ring bearing. Embodiments of the method also include receiving, via a controller, signals from the at least one optical fiber sensor indicative of one or more changes associated with the slewing ring bearing. Embodiments of the method also include comparing, via the controller, the one or more changes associated with the slewing ring bearing to a damage threshold. Embodiments of the method also include implementing, via the controller, a control action when the one or more changes exceeds the damage threshold to prevent or minimize further damage from occurring to the slewing ring bearing.

In still another aspect, the present disclosure is directed to a system for monitoring a damage of a slewing ring bearing for a wind turbine. Embodiments of the system include at least one optical fiber sensor arranged adjacent to or at least partially on at least one of an inner race or an outer race of the slewing ring bearing. Embodiments of the system also include a controller communicatively coupled to the at least one optical fiber sensor, the controller configured to perform a plurality of operations, the plurality of operations comprising: receiving one or more sensor signals from the at least one optical fiber sensor indicative of one or more changes associated with the slewing ring bearing or structure adjacent to the slewing ring bearing; comparing the one or more changes associated with the slewing ring bearing or the structure adjacent to the slewing ring bearing to a damage threshold; and implementing a control action when the one or more changes exceed the damage threshold to prevent or minimize further damage from occurring to the slewing ring bearing or the structure adjacent to the slewing ring bearing.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
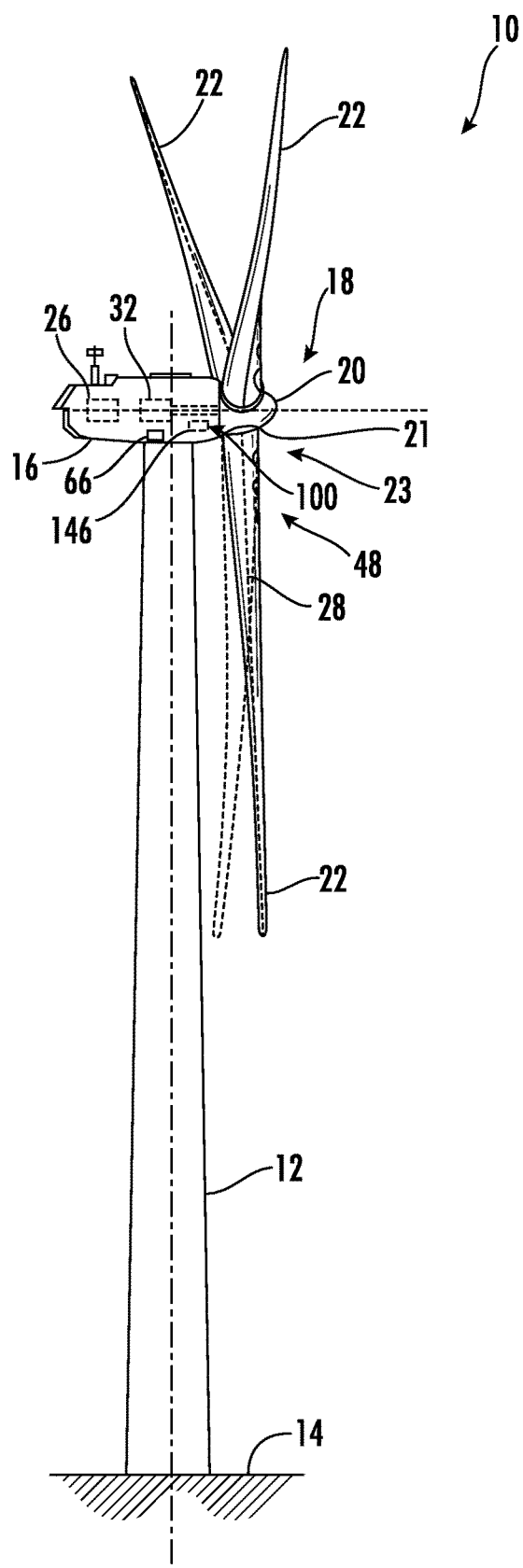
FIG. 1 illustrates a perspective view of an embodiment of a wind turbine according to the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for monitoring damage of a slewing ring bearing of a wind turbine. Thus, systems and methods of the present disclosure are described herein as they may relate to wind turbine bearings, including, at least, slewing ring bearings such as pitch bearings, yaw bearings, and/or similar, as well as to components engaged to and/or adjacent to such bearings. In particular embodiments, for example, the components may include structure(s) adjacent to the pitch bearings at the interface of each rotor blade and the rotor hub, such as, a blade root of each rotor blade and/or a hub body of the rotor hub. It should be appreciated, however, that the systems and methods according to the present disclosure are not limited to use with a wind turbine, but are applicable to any suitable bearing application. For example, it should be understood that the systems and methods as described herein are applicable, in an embodiment, to any suitable slewing ring bearings known in the art and/or later developed and are not limited to a specific slewing bearing configuration.

Accordingly, in an embodiment, systems and methods of the present disclosure include arranging at least one optical fiber sensor adjacent to or at least partially on an inner race and/or an outer race of the slewing ring bearing. A controller is thus configured to receive signals from the optical fiber sensor(s) indicative of one or more changes associated with the slewing ring bearing. The controller can then compare the change(s) to a damage threshold and implement a control action when the change(s) exceed the damage threshold to prevent or otherwise minimize further damage from occurring to the slewing ring bearing.

Referring now to FIG. 1, a perspective view of an embodiment of a wind turbine 10 that may implement a system 100 for monitoring damage according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a hub 20 that is rotatable and at least one rotor blade 22, which together define an interface 21 of the rotor blade(s) 22 and the hub 20. In particular embodiments, as shown, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to a generator 24 (FIG. 2), in particular, an electric generator, positioned within the nacelle 16 to permit electrical energy to be produced.

Further, as shown, the rotor blades 22 are coupled to and extend outwardly from the hub 20 and, therefore, the interface 21 may generally define a load transfer region. More specifically, in the illustrated embodiment, loads induced to the rotor blades 22 from the wind may be transferred to hub 20 via the load transfer regions.

In further embodiments, as shown in FIG. 1, the wind turbine 10 may further include a controller 26 for controlling the various wind turbine components and/or for implementing the methods and/or systems described herein. Moreover, as shown, the wind turbine 10 may be situated within the nacelle 16. However, in other embodiments, the controller 26 may be located within any other component of the wind turbine 10 or at a location outside the wind turbine. Further, the controller 26 may be communicatively coupled to and/or may include any number of the components in order to control the operation of such components and/or to implement a corrective action.

Figure 2:
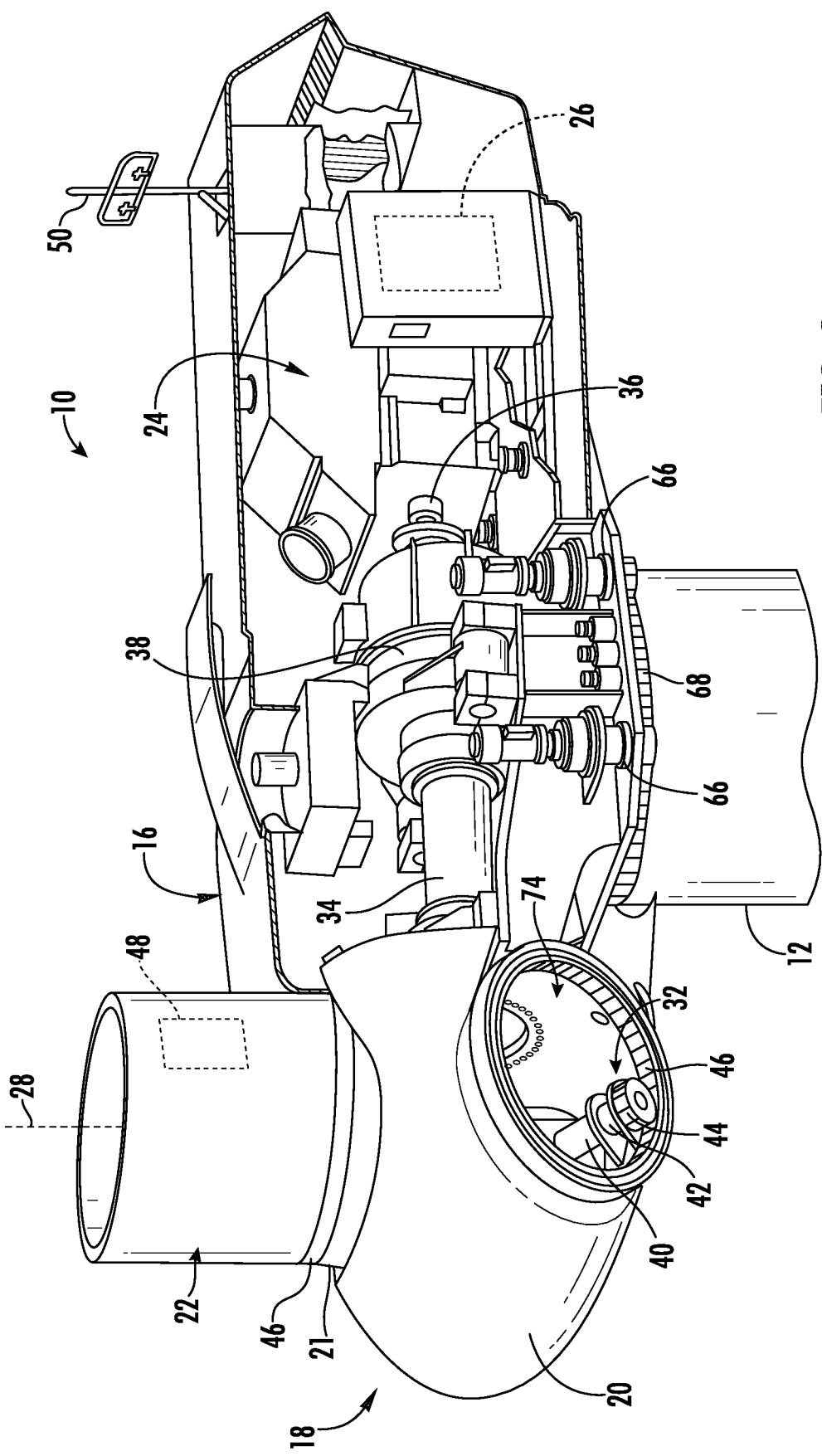
FIG. 2 illustrates a simplified, internal view of an embodiment of a nacelle of a wind turbine according to the present disclosure.

Referring now to FIG. 2, a simplified, internal view of an embodiment of the nacelle 16 of the wind turbine 10 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, the hub 20 may define a hub cavity 74 and at least some of the pitch adjustment mechanism 32, for example, may be at least partially situated with in the hub cavity 74. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 (which is a type of slewing ring bearing) coupled between the hub 20 and a rotor blade 22 corresponding thereto such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28.

Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10). As used herein, the term "yaw" refers to an orientation of nacelle 16 with respect to wind direction. Similar to the pitch bearing(s) 46, the yaw bearings 68 described herein are also a type of slewing ring bearing.

Still referring to FIG. 2, the wind turbine 10 may also include one or more sensors 48, 50 for measuring various operating parameters that may be used to calculate a strain and/or damage of one or more bearings as described in detail herein. For example, in certain embodiments, the sensors may include at least one sensor 48 for measuring a position/orientation, deformation, and/or loading of the rotor blade(s) 22 (such as a pitch angle of the rotor blade(s) 22, a bending moment of the rotor blade(s) 22, a strain, etc.). In another embodiment, the wind turbine 10 may also generator sensors (not illustrated) for monitoring the generator 24 (e.g. torque, rotational speed, acceleration and/or the power output); sensors for measuring the imbalance loading in the rotor 18 (e.g. main shaft bending sensors); and/or various wind sensors 50 that are local or remote and for measuring various wind parameters, such as wind speed, wind peaks, wind turbulence, wind shear, changes in wind direction, air density, wind fronts, wind farm conditions, or similar. Further, the sensors may be located near the ground of the wind turbine 10, on the nacelle 16, or on a meteorological mast of the wind turbine 10 or remote to the wind turbine 10.

It should also be understood that any other number or type of sensors may be employed and at any location. For example, the sensors may be Fiber Bragg Grating sensors, Micro Inertial Measurement Units (MIMUs), strain gauges, accelerometers, pressure sensors, angle of attack sensors, vibration sensors, proximity sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter, e.g., may be used to generate, via the at least one optical fiber sensor, a plurality of pulses, and reflecting and transmitting the plurality of signals through one or more optical fiber strands, and analyzing the reflected and transmitted plurality of signals for a change in wavelength or frequency of the reflected signal indicative of strain or damage.

Figure 3:
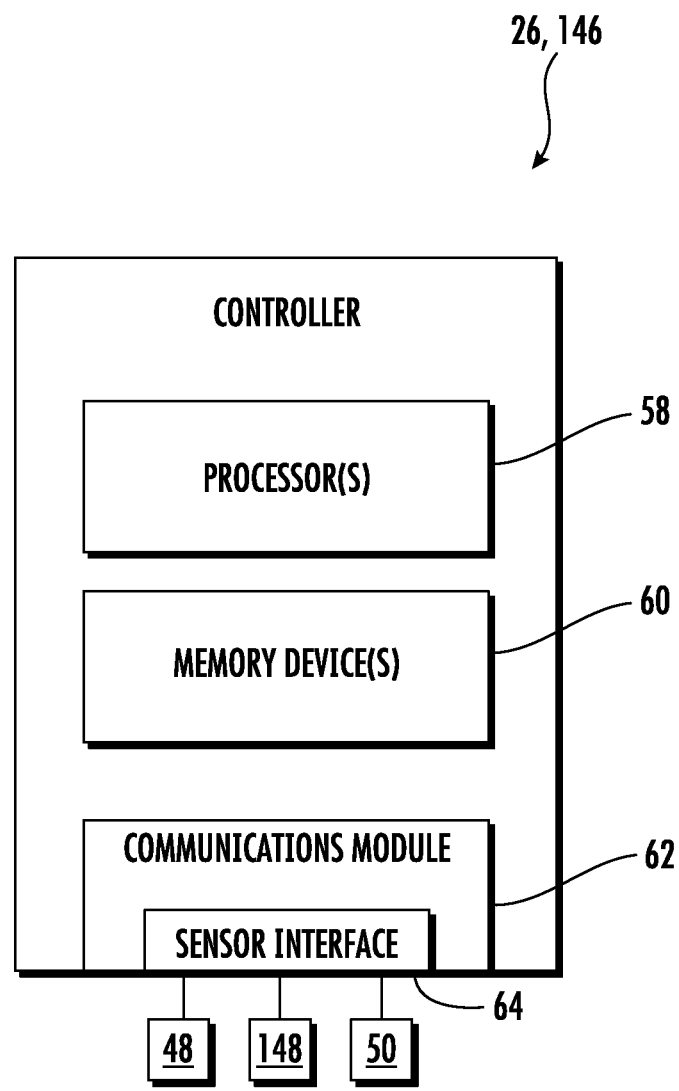
FIG. 3 illustrates a schematic diagram of an embodiment of a controller of a wind turbine according to the present disclosure.

Referring now to FIG. 3, a block diagram of an embodiment of various components of the controller 26 is illustrated according to the present disclosure. As shown, the controller 26 may include the one or more processor(s) 58 and the associated memory device(s) 60 configured to perform the variety of computer-implemented functions (e.g., performing the methods, steps, calculations and the like and storing relevant data) as disclosed in detail herein. Additionally, the controller 26 also may include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50 to be converted into signals that can be understood and processed by the processor(s) 58. It should be appreciated that the sensors 48, 50 may be communicatively coupled to the communications module 62 using any suitable means. For example, as illustrated in FIG. 3, the sensors 48, 50 are coupled to the sensor interface 64 via a wired connection. However, in other embodiments, the sensors 48, 50 may be coupled to the sensor interface 64 via a wireless connection, such as by using any suitable wireless communications protocol known in the art.

Accordingly, in an embodiment, it is appreciated that the controller 26 may be part of the system 100 for monitoring damage according to the present disclosure and may be configured to control the various operating modes (e.g., start-up or shut-down sequences), de-rate the wind turbine 10, and/or control various components of the wind turbine 10 in response to signals received by the controller 26 (e.g., sensor signal(s) indicative of strain or damage to the slewing ring bearing(s) 46, 68, sensor signal(s) indicative of strain or damage to the blade root 23 of the rotor blade(s) 22, and sensor signal(s) indicative of strain or damage to the hub 20) as is discussed in detail herein.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more current wind turbine parameters of the wind turbine 10 based on the plurality of operating data, determining a maximum wind turbine parameter, transmitting suitable control signals to implement control actions to reduce loads acting on the wind turbine, and various other suitable computer-implemented functions.

Figure 4:
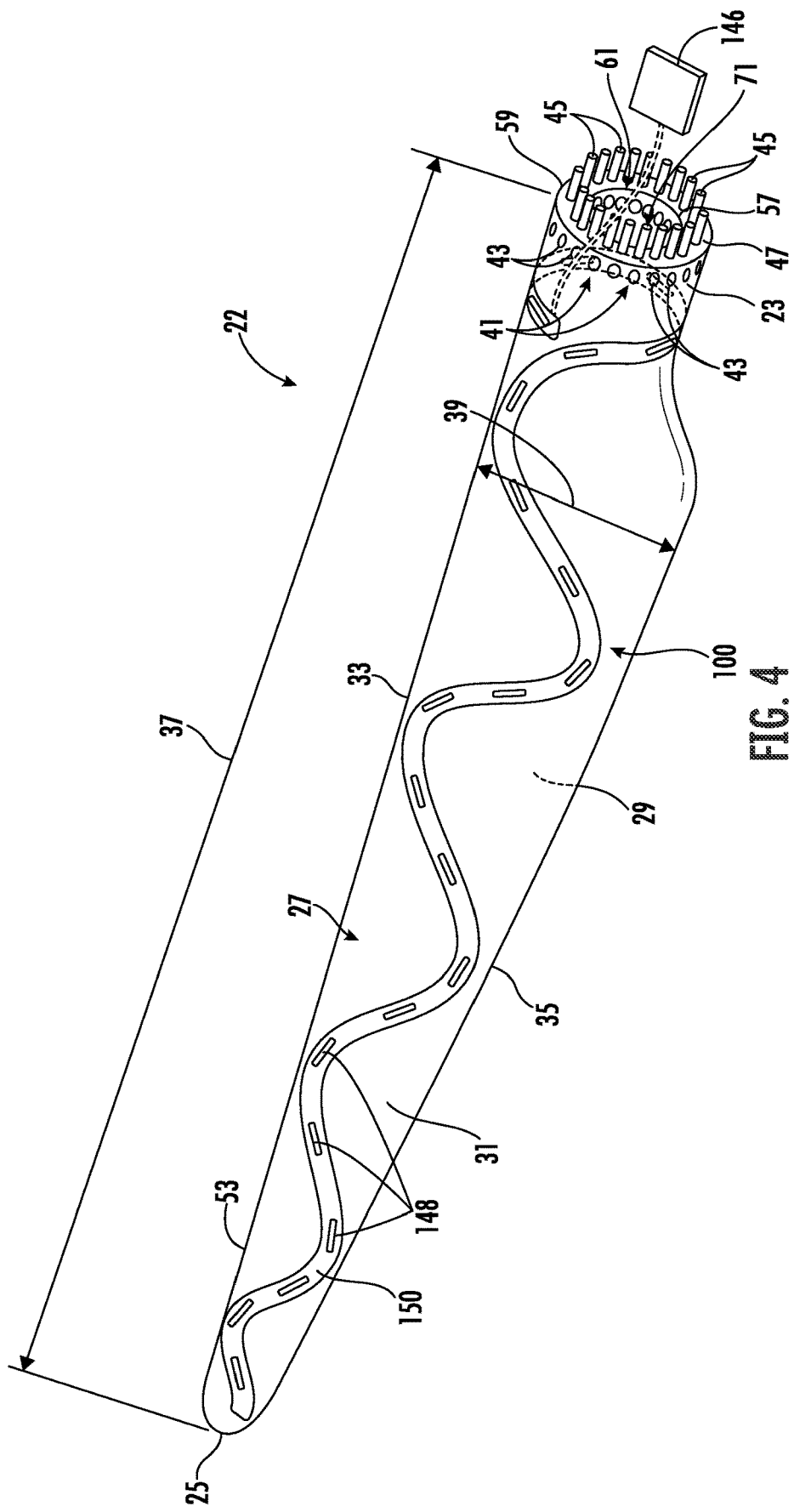
FIG. 4 illustrates a perspective view of an embodiment of a rotor blade of a wind turbine according to the present disclosure.

Referring now to FIG. 4, a perspective view of an embodiment of the rotor blades 22 is illustrated according to the present disclosure. The rotor blade 22 includes a blade root 23 configured for mounting the rotor blade 22 to the hub 20 and a blade tip 25 disposed opposite the blade root 23. A body 27 of the rotor blade 22 may extend lengthwise between the blade root 23 and the blade tip 25 and may generally serve as the outer shell, or as a blade sidewall 53, for example, of the rotor blade 22. As is generally understood, the body 27 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 27 may generally include a pressure side 29 and a suction side 31 extending between a leading edge 33 and a trailing edge 35. Additionally, the rotor blade 22 may have a span 37 defining the total length of the body 27 between the blade root 23 and the blade tip 25 and a chord 39 defining the total length of the body 27 between the leading edge 33 and the trailing edge 35. It is appreciated that the chord 39 may vary in length with respect to the span 37 as the body 27 extends from the blade root 23 to the blade tip 25.

Moreover, in the illustrated embodiment, the rotor blade 22 may also include a plurality of T-bolts or root attachment assemblies 41 for coupling the blade root 23 to the hub 20 of the wind turbine 10. In general, each root attachment assembly 41 may include a barrel nut 43 mounted within a portion of the blade root 23 and a root bolt 45 coupled to and extending from the barrel nut 43 so as to project outwardly from a root end 47 of the blade root 23. By projecting outwardly from the root end 47, the root bolts 45 may generally be used to couple the blade root 23 to the hub 20 (e.g., via the slewing ring bearing 46) at the interface 21 (FIGS. 1 and 2), as is described in detail herein.

Moreover, in the illustrated embodiment, the rotor blade 22 also includes the blade sidewall 53 that extends between the blade root 23 and the blade tip 25 and along the span 37 defining the total length of the body 27. The blade sidewall 53 has an inner surface 57 and an outer surface 59 that at least partially defines a blade cavity 61 that extends from the blade root 23 towards the blade tip 25. The blade cavity 61 is accessible via an opening 71.

Referring generally to FIGS. 1 and 4-7, various views of different components of the system 100 for monitoring damage of the wind turbine 10 (e.g., implemented via the controller 26 for the wind turbine 10) are illustrated. In particular, as shown in FIG. 1, for example, the system 100 may be configured to monitor damage at the interface 21 between the blade root 23 and the hub 20. In another embodiment, the system 100 may be configured to monitor the pitch bearing 46 (see e.g., FIG. 6). In still another embodiment, the system 100 may be configured to monitor the hub 20 (see e.g., FIG. 7).

More specifically, in the illustrated embodiment, as shown in FIGS. 4-7, the system 100 for monitoring damage may also include a measuring system 146. The measuring system 146 may have one or more processors and/or be similarly configured to the controller 26 (FIG. 3). Accordingly, in an embodiment, the measuring system 146 may complement or supplement the controller 26 and thus may be optional. Moreover, in an embodiment, the measuring system 146 may be situated within, on, or adjacent to the nacelle 16. Alternatively, the measuring system 146 may be a distributed system throughout the wind turbine 10, on the support surface 14, within a remote wind farm structure (not illustrated), at a remote control center (not illustrated), etc.

In certain embodiments, the system 100 may be communicatively coupled to the pitch adjustment mechanism 32 (FIG. 2) to control a pitch of the rotor blade 22 as is described in detail herein. In another embodiment, a pitch angle of each rotor blade 22 is controlled by the system 100 for monitoring damage via the controller 26 that is dedicated to that rotor blade 22. Alternatively, the pitch angle for all the rotor blades 22 may be controlled simultaneously by the system 100 for monitoring damage via a controller 26 that is shared. Similarly, the system 100 for monitoring damage may be communicatively coupled to the yaw drive mechanism 66 (FIG. 2) to adjust the yaw of the nacelle 16 as is described in detail herein.

In further embodiments, for example, the measuring system 146 includes one or more sensors 148 (see e.g., FIGS. 4-7) and may be communicatively coupled to the controller 26. As such, in an embodiment, the sensor(s) 148 may include strain gauges, optical fiber sensors, temperature sensors, pressure meters, or the like and may be situated at various locations on the wind turbine 10 and that are communicatively coupled to the controller 26.

In an embodiment, for example, the sensor(s) 148 may be coupled to portions of the rotor blade 22 (in particular, the blade root 23), the pitch bearing 46, the yaw bearing 68, and/or and the hub 20 to transmit one or more signals indicative of strain or damage to the measuring system 146. In certain embodiments, for example, the sensor(s) 148 may be coupled to an inner surface of the rotor blade 22, and outer surface of the rotor blade 22, and/or coupled between the inner and outer surfaces. As such, the sensor(s) 148 may be configured to transit a signal indicative of a position of the respective portion(s) of the rotor blade(s) 22, indicative of a pitch angle of the rotor blade(s) 22, indicative of a deflection or deformation or bending of the rotor blade(s) 22, and/or indicative of a load, a strain, and/or a damage acting on the respective portion(s) of the rotor blade(s) 22.

Figure 5:
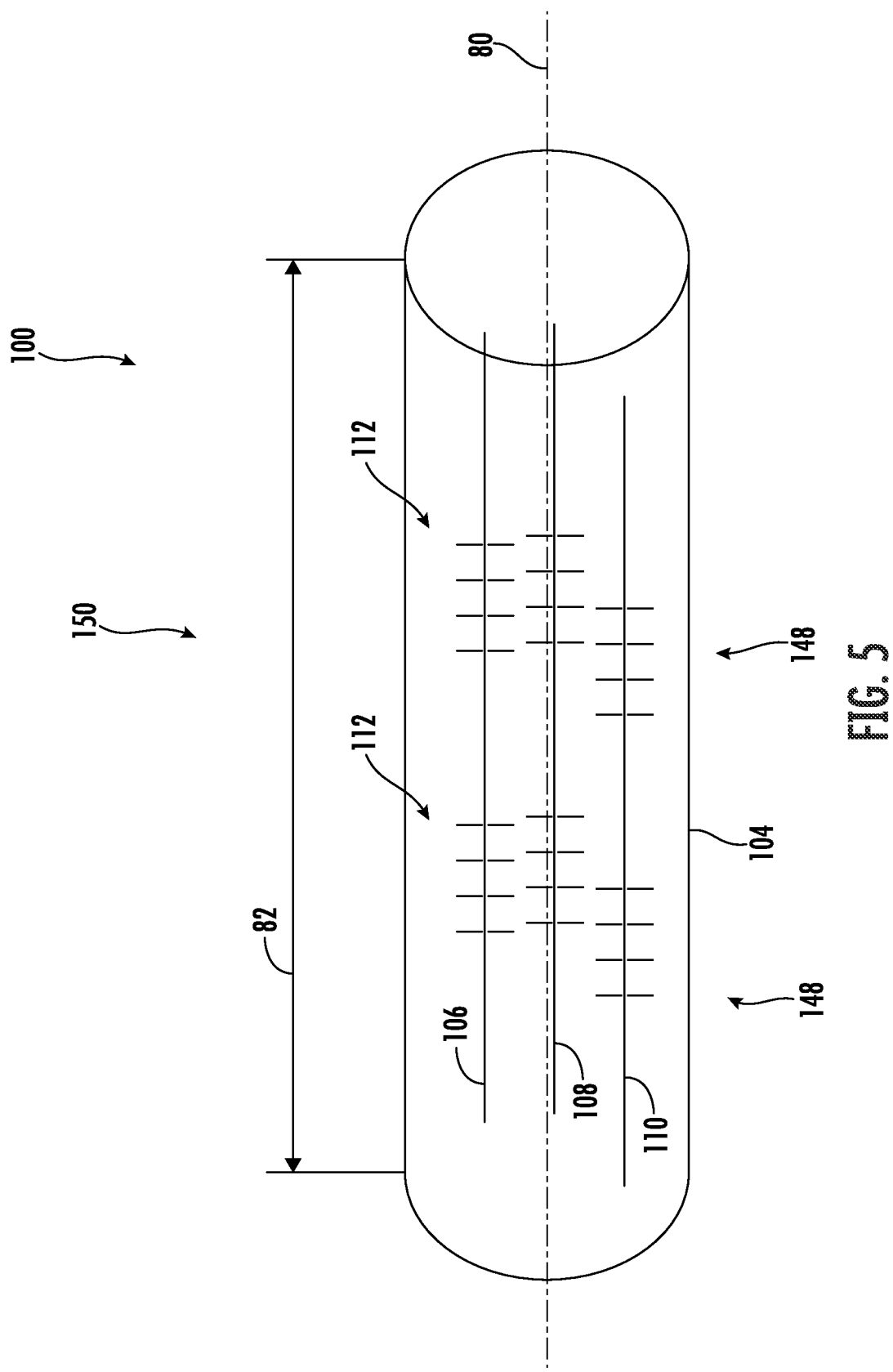
FIG. 5 illustrates a simplified, internal view of a sensor of a wind turbine according to the present disclosure.

For example, as illustrated in FIG. 5, the sensor(s) 148 may be configured as part of a fiber optic strand 150. Thus, in an embodiment, the sensor(s) 148 are axially spaced along the fiber optic strand 150 and are configured to transit a signal indicative of a position of respective portion of the rotor blade(s) 22 and/or indicative of a load, a strain, and/or a damage acting on the respective portion of the rotor blade(s) 22, e.g., to transmit a signal indicative of damage of the blade root 23. Moreover, as shown in FIG. 5, the fiber optic strand 150 may include a multicore optical fiber 104 that includes a plurality of fiber cores 106, 108, 110 to enable the system 100 for monitoring damage to send and receive signals as described in detail herein. Alternatively, the multicore optical fiber 104 may include any number of fiber cores to enable the system 100 to function as described herein. In the illustrated embodiment, the sensor(s) 148 may be a Fiber Bragg Grating 112 that is disposed within each fiber core 106, 108, 110. Each Fiber Bragg Grating 112 is configured to measure strain on the respective fiber cores 106, 108, 110 as a position and/or orientation of multicore optical fiber 104 is changed. Each Fiber Bragg Grating 112 is configured to reflect a predetermined frequency band of light that is dependent upon the modulation period formed in a respective fiber core 106, 108, 110.

In certain embodiment, the measuring system 146 may include a frequency domain reflectometer (not illustrated) that is communicatively coupled with the multicore optical fiber 104 to receive signals that are transmitted from each Fiber Bragg Grating 112. As such, each Fiber Bragg Grating 112 is configured to transmit a signal indicative of an optical path length of Fiber Bragg Grating 112 to the frequency domain reflectometer, and the frequency domain reflectometer is configured to calculate an optical path length between each Fiber Bragg Grating 112 and frequency domain reflectometer along a respective fiber core 106, 108, 110.

During operation of the wind turbine 10, a movement of the rotor blade 22 from a neutral position to a deflected position (FIG. 1—dashed line rotor blade 22) may cause the multicore optical fiber 104 and the Fiber Bragg Gratings 112 to move with the rotor blade 22. As the multicore optical fiber 104 and the Fiber Bragg Gratings 112 move, the Fiber Bragg Gratings 112 stretch or compress causing the modulation period of the Fiber Bragg Grating 112 to change, which in turn causes a shift in the frequency reflected by the Fiber Bragg Grating 112. The frequency domain reflectometer, therefore, may be configured to calculate the change in frequency, and to calculate the magnitude and direction of movement of each Fiber Bragg Grating 112 and of the multicore optical fiber 104 based, at least in part, on the calculated change in frequency. As such, the measuring system 146 is configured to calculate a position of each Fiber Bragg Grating 112 based, at least in part, on the calculated magnitude and direction of movement of each Fiber Bragg Grating 112. The measuring system 146 also is configured to calculate a shape, deflection, deformation, strain, or damage of the rotor blade 22 based, at least in part, on the calculated position of each Fiber Bragg Grating 112 or the calculated change in frequency.

Figure 6:
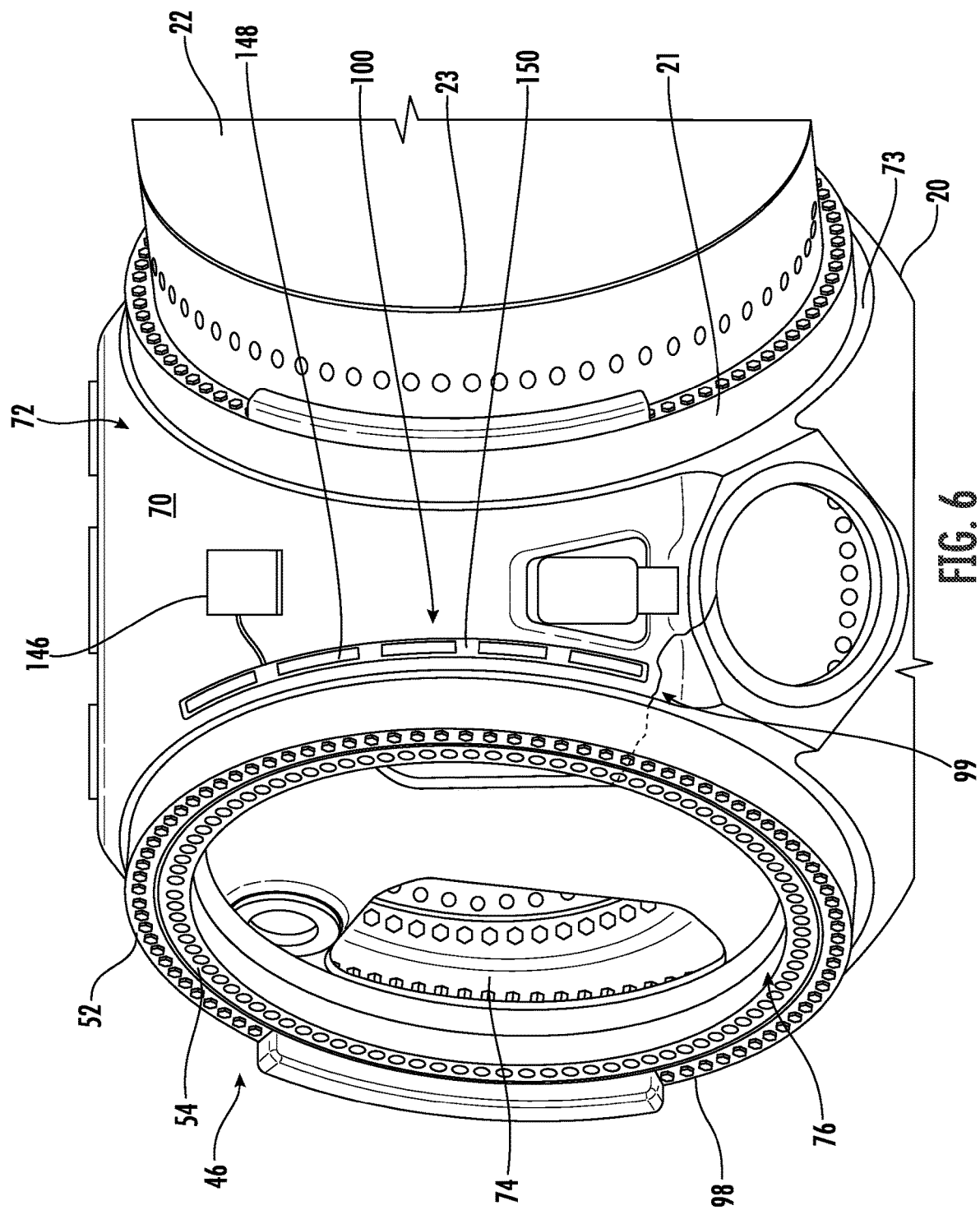
FIG. 6 illustrates a perspective view of an embodiment of a hub of a wind turbine according to the present disclosure.

Referring now to FIG. 6, a perspective view of an embodiment of the hub 20 is illustrated according to the present disclosure. Generally, as shown, the pitch bearing 46 includes an outer race 52, an inner race 54, and a plurality of roller elements (not illustrated) disposed between the outer and inner races 52, 54. The outer race 52 is generally configured to be mounted to the hub 20 using a plurality of hub bolts 98 and/or other suitable fastening mechanisms. Similarly, the inner race 54 is generally configured to be mounted to the blade root 23 as described in detail herein (FIG. 4). As is generally understood, the inner race 54 may be configured to be rotated relative to the outer race 52 (via the roller elements) to allow the pitch angle of each rotor blade 22 to be adjusted. As shown in FIG. 2, such relative rotation of the outer and inner races 52, 54 may be achieved using the pitch adjustment mechanism 32.

In the illustrated embodiment, the hub 20 includes a hub body 70 having an engagement region 72 corresponding to each of the rotor blades 22 and may generally serve as the structural shell, or as a hub wall 73, defining the hub cavity 74 of the hub 20. As is generally understood, each engagement region 72 defines an opening 76 to the hub cavity 74. The rotor blade 22 includes the plurality of T-bolts or root attachment assemblies 41 (see e.g., FIG. 4), and the plurality of T-bolts or root attachment assemblies 41 couple the blade root 23 to the engagement region 72 of the hub 20 with the slewing ring bearing 46 therebetween. This forms the interface 21 as is described in detail herein.

Moreover, in the illustrated embodiment, the hub wall 73 of the hub 20 has an inner surface 77 and an outer surface 78 that at least partially define the hub cavity 74. The hub cavity 74 is accessible via each of the openings 76. Accordingly, in an embodiment, the sensor(s) 148 may be coupled to the hub wall 73. More specially, as shown, the sensor(s) 148 may be coupled to outer surface 78 of the hub wall 73 about the outer periphery of the outer race 52 of the slewing ring bearing 46. Alternatively, the sensor(s) 148 may be coupled to the inner surface 77 (FIG. 7) of the hub wall 73, and/or coupled to the outer surface 78 of the hub wall 73 but between the engagement region 72 of the hub 20 and the outer race 52 of the slewing ring bearing 46. As such, the sensor(s) 148 of the hub 20 may be configured to transit a signal indicative of a deflection or deformation or bending of the hub wall 73, e.g., signal indicative of a plug hole crack(s) (not illustrated) and/or a bolt hole corrosion crack(s) (not illustrated) in the hub wall 73. For example, the sensor(s) 148 of the hub 20 may be configured to transmit a signal indicative of a load, a strain, and/or a damage acting on the engagement portion(s) of the hub 20 and/or acting on the interface 21, e.g., acting on the slewing ring bearing 46.

Moreover, in the illustrated embodiment, the sensor(s) 148 may be configured as part of the fiber optic strand 150 (see e.g., FIG. 5) having a length that is engaged (e.g., using an adhesive) about an outer periphery of the outer race 52 of the pitch bearing 46. The sensor(s) 148 are axially spaced along the fiber optic strand 150 and are configured to transit a signal indicative of a load, a strain, and/or a damage acting on the interface 21, e.g., to transmit a signal indicative of damage of the hub wall 73 at or adjacent to the engagement region 72 of the hub 20.

During operation of the wind turbine 10, as shown in FIG. 6, for example, a crack 99 may propagate along the hub wall 73 of the hub body 70. The crack 99 may cause the multicore optical fiber 104 of the fiber optic strand 150 and the Fiber Bragg Gratings 112 to deform. As the multicore optical fiber 104 and the Fiber Bragg Gratings 112 deform, the Fiber Bragg Gratings 112 stretch or compress causing the modulation period of the Fiber Bragg Grating 112 to change, which in turn causes a shift in the frequency reflected by the Fiber Bragg Grating 112. As such, the measuring system 146 and/or the controller 26 is/are configured to calculate a position of each Fiber Bragg Grating 112 based, at least in part, on the calculated magnitude and direction of deformation, stretching, or compressing of each Fiber Bragg Grating 112, for example. The measuring system 146 and/or the controller 26 also is/are configured to calculate a shape, deflection, deformation, strain, or damage of the hub 20 based, at least in part, on the calculated change to the one or more of the Fiber Bragg Grating(s) 112 and the calculated change in frequency.

In the illustrated embodiment, the system 100 is configured to operate the pitch adjustment mechanism 32 to modulate a pitch angle of the rotor blade(s) 22. Alternatively, the system 100 may be configured to operate the yaw drive mechanisms 66.

Figure 7:
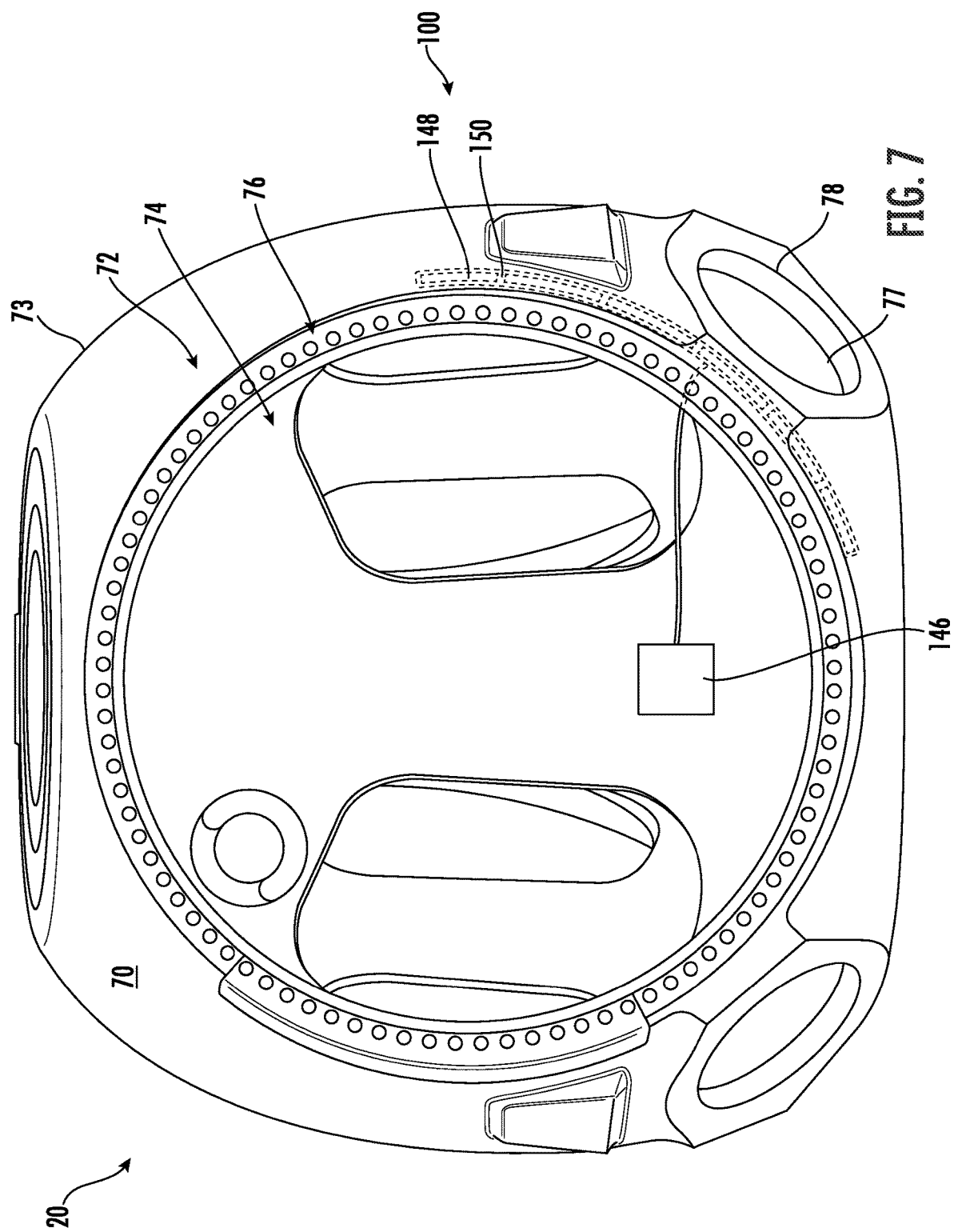
FIG. 7 illustrates a perspective view of an embodiment of a hub of a wind turbine according to the present disclosure, particularly illustrating a measuring system arranged with the hub.

Referring now to FIG. 7, a perspective view of another embodiment of the hub 20 is illustrated according to the present disclosure. In the illustrated embodiment, the sensor(s) 148 are coupled to the inner surface 77 of the hub wall 73 behind the engagement region 72 of the hub 20, and/or coupled to the outer surface 78 of the hub wall 73 on the engagement region 72 of the hub 20 about the periphery of the opening 76.

Figure 8:
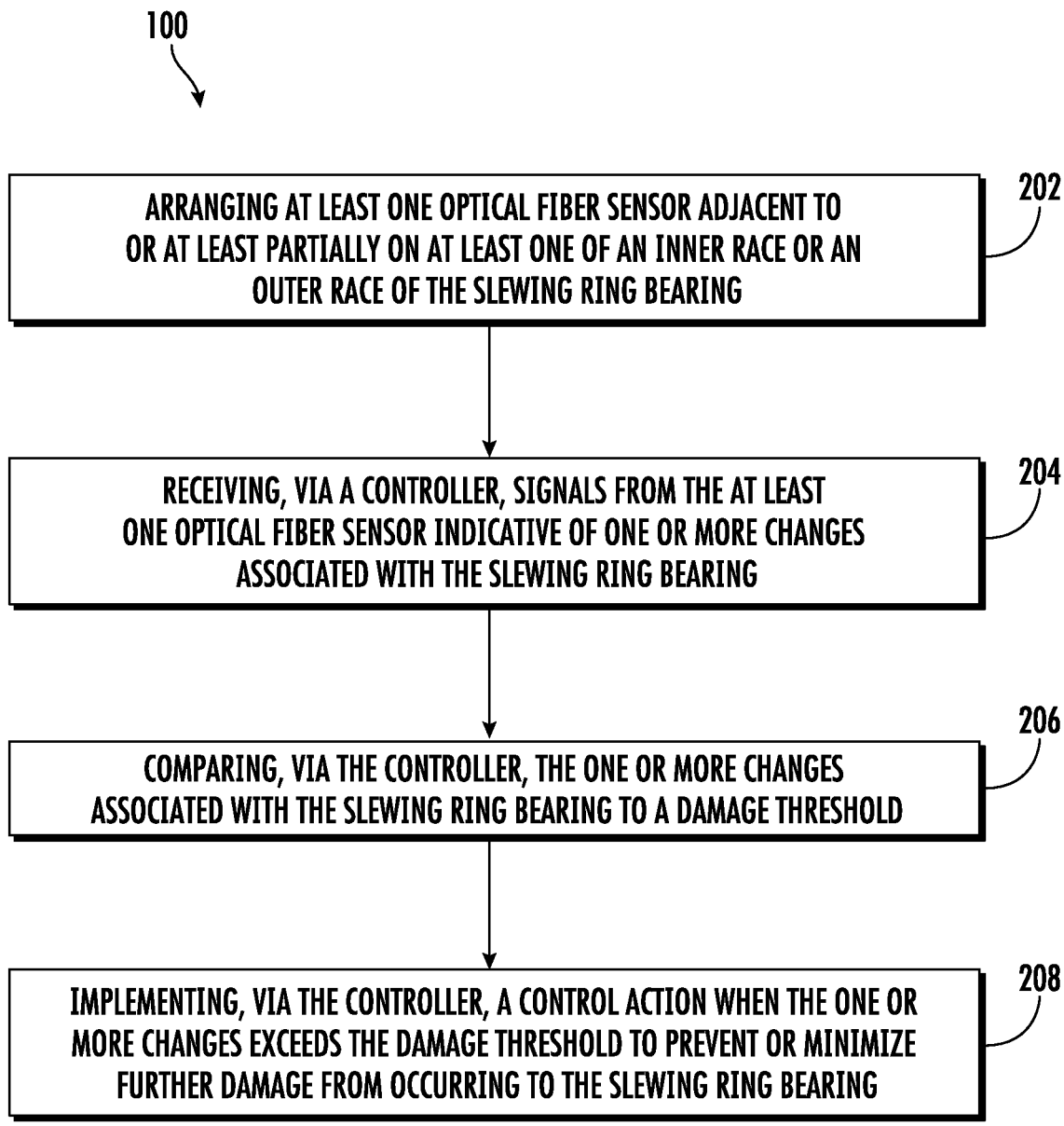
FIG. 8 illustrates a flow diagram of an embodiment of a method for monitoring damage of a bearing of a wind turbine according to the present disclosure.

Referring now to FIG. 8, a flow diagram of an embodiment of a method 200 for monitoring damage of a slewing ring bearing of a wind turbine is illustrated according to the present disclosure. The method 200 is described herein as implemented using, for example, the wind turbine 10 described above. However, it should be appreciated that the disclosed method 200 may be implemented using any other suitable wind turbine now known or later developed in the art. In addition, although FIG. 8 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes arranging at least one optical fiber sensor adjacent to or at least partially on at least one of an inner race or an outer race of the slewing ring bearing. In an embodiment, (202) includes arranging the at least one optical fiber sensor at least partially on an exterior surface of a hub of the wind turbine. In another embodiment, (202) includes arranging the at least one optical fiber sensor at least partially within a hub of the wind turbine. In another embodiment, (202) includes circumferentially distributing a plurality optical fiber sensors adjacent to or at least partially on at least one of the inner race or the outer race of the slewing ring bearing.

As shown at (204), the method 200 also includes receiving, via a controller, signals from the at least one optical fiber sensor indicative of one or more changes associated with the slewing ring bearing. As shown at (206), the method 200 also includes comparing, via the controller, the one or more changes associated with the slewing ring bearing to a damage threshold. As shown at (208), the method 200 also includes implementing, via the controller, a control action when the one or more changes exceeds the damage threshold to prevent or minimize further damage from occurring to the slewing ring bearing.

More specifically, in certain embodiments, the method 200 may include comparing signals from the plurality optical fiber sensors to evaluate damage occurring in the slewing ring bearing. Moreover, in certain embodiment, the method 200 may include generating, via the at least one optical fiber sensor, a plurality of pulses; reflecting and transmitting the plurality of pulses; and analyzing the reflected and transmitted plurality of pulses to produce a signal indicative of strain to the slewing ring bearing. In such embodiments, the method 200 may include determining a frequency shift in the reflected and transmitted plurality of pulses.

Further aspects of the present disclosure are provided by the subject matter of the following clauses:

A method for monitoring damage of a slewing ring bearing of a wind turbine, the method comprising arranging at least one optical fiber sensor adjacent to or at least partially on at least one of an inner race or an outer race of the slewing ring bearing; receiving, via a controller, signals from the at least one optical fiber sensor indicative of one or more changes associated with the slewing ring bearing; comparing, via the controller, the one or more changes associated with the slewing ring bearing to a damage threshold; and implementing, via the controller, a control action when the one or more changes exceeds the damage threshold to prevent or minimize further damage from occurring to the slewing ring bearing.

The method of the preceding clause, wherein arranging the at least one optical fiber sensor adjacent to or at least partially on at least one of the inner race or the outer race of the slewing ring bearing further comprises: arranging the at least one optical fiber sensor at least partially on an exterior surface of a hub of the wind turbine.

The method of any of the preceding clauses, wherein arranging the at least one optical fiber sensor adjacent to or at least partially on at least one of the inner race or the outer race of the slewing ring bearing further comprises: arranging the at least one optical fiber sensor at least partially within a hub of the wind turbine.

The method of any of the preceding clauses, wherein arranging at least one optical fiber sensor at least partially adjacent to or on at least one of the inner race or the outer race of the slewing ring bearing further comprises: circumferentially distributing a plurality optical fiber sensors adjacent to or at least partially on at least one of the inner race or the outer race of the slewing ring bearing.

The method of the preceding clause, further comprising comparing signals from the plurality optical fiber sensors to evaluate damage occurring in the slewing ring bearing.

The method of any of the preceding clauses, further comprising generating, via the at least one optical fiber sensor, a plurality of pulses; reflecting and transmitting the plurality of pulses; and analyzing the reflected and transmitted plurality of pulses to produce a signal indicative of strain to the slewing ring bearing.

The method of the preceding clause, wherein analyzing the reflected and transmitted plurality of pulses to produce the signals indicative of strain further comprises determining a frequency shift in the reflected and transmitted plurality of pulses.

The method of any of the preceding clauses, wherein the one or more changes associated with the slewing ring bearing comprise at least one of strain, temperature, and deformation.

The method of any of the preceding clauses, wherein the at least one optical fiber sensor is a Fiber Bragg Grating fiber optic strand.

The method of any of the preceding clauses, wherein arranging at least one optical fiber sensor at least partially on at least one of the inner race or the outer race of the slewing ring bearing further comprises: securing the at least one optical fiber sensor adjacent to or at least partially on at least one of the inner race or the outer race of the slewing ring bearing via an adhesive.

The method of any of the preceding clauses, wherein the slewing ring bearing comprises one of a pitch bearing or a yaw bearing of the wind turbine.

A system for monitoring a damage of a slewing ring bearing for a wind turbine, the system comprising: at least one optical fiber sensor arranged adjacent to or at least partially on at least one of an inner race or an outer race of the slewing ring bearing; and a controller communicatively coupled to the at least one optical fiber sensor, the controller configured to perform a plurality of operations, the plurality of operations comprising: receiving one or more sensor signals from the at least one optical fiber sensor indicative of one or more changes associated with the slewing ring bearing or structure adjacent to the slewing ring bearing; comparing the one or more changes associated with the slewing ring bearing or the structure adjacent to the slewing ring bearing to a damage threshold; and implementing a control action when the one or more changes exceed the damage threshold to prevent or minimize further damage from occurring to the slewing ring bearing or the structure adjacent to the slewing ring bearing.

The method of the preceding clause, wherein the at least one optical fiber sensor is arranged at least partially on an exterior surface of a hub of the wind turbine.

The method of any of the preceding clauses, wherein the at least one optical fiber sensor is arranged at least partially on an interior surface of a hub of the wind turbine.

The method of any of the preceding clauses, wherein the at least one optical fiber sensor are circumferentially distributed adjacent to or at least partially on at least one of the inner race or the outer race of the slewing ring bearing.

The method of any of the preceding clauses, wherein the controller is further configured to: compare signals from the at least one optical fiber sensors to evaluate damage occurring in the slewing ring bearing.

The method of any of the preceding clauses, wherein the at least one optical fiber sensor is configured to generate a plurality of pulses and to reflect and transmit the plurality of pulses, and wherein the controller is further configured to analyze the reflected and transmitted plurality of pulses to produce the signals of the one or more changes associated with the slewing ring bearing or the structure adjacent to the slewing ring bearing.

The method of the preceding clause, wherein the controller is further configured to determine a frequency shift in the reflected and transmitted plurality of pulses.

The method of any of the preceding clauses, wherein the at least one optical fiber sensor is a Fiber Bragg Grating fiber optic strand.

The method of any of the preceding clauses, wherein the slewing ring bearing comprises one of a pitch bearing or a yaw bearing of the wind turbine.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring damage of a slewing ring bearing of a wind turbine, the method comprising:
   arranging at least one optical fiber sensor adjacent to at least one of an inner race or an outer race of the slewing ring bearing;
   receiving, via a controller, signals from the at least one optical fiber sensor indicative of one or more changes associated with the slewing ring bearing;
   comparing, via the controller, the one or more changes associated with the slewing ring bearing to a damage threshold;
   implementing, via the controller, a control action when the one or more changes exceeds the damage threshold to prevent or minimize further damage from occurring to the slewing ring bearing; and
   wherein the wind turbine includes a hub with a hub wall that defines an engagement region around an opening to an internal hub cavity, the slewing ring bearing mounted in the opening, the method comprising arranging the optical fiber sensor on an outer surface of the engagement region of the hub wall radially outward of and adjacent the slewing ring bearing or to an inner surface of the engagement region of the hub wall within the hub cavity radially outward of and adjacent the slewing ring bearing.

2. The method of claim 1, further comprising:
   circumferentially distributing a plurality of the optical fiber sensors adjacent to the slewing ring bearing on the outer surface of the engagement region or on the inner surface of the engagement region.

3. The method of claim 2, further comprising comparing signals from the plurality optical fiber sensors to evaluate damage occurring in the slewing ring bearing.

4. The method of claim 1, further comprising:
   generating, via the at least one optical fiber sensor, a plurality of pulses;
   reflecting and transmitting the plurality of pulses; and
   analyzing the reflected and transmitted plurality of pulses to produce a signal indicative of strain to the slewing ring bearing.

5. The method of claim 4, wherein analyzing the reflected and transmitted plurality of pulses to produce the signals indicative of strain further comprises:
   determining a frequency shift in the reflected and transmitted plurality of pulses.

6. The method of claim 1, wherein the one or more changes associated with the slewing ring bearing comprise at least one of strain, temperature, and deformation.

7. The method of claim 1, wherein the at least one optical fiber sensor is a Fiber Bragg Grating fiber optic strand.

8. The method of claim 1, wherein
   the at least one optical fiber sensor is secured to the outer or inner surface of the engagement region via an adhesive.

9. The method of claim 1, wherein the slewing ring bearing comprises one of a pitch bearing or a yaw bearing of the wind turbine.

10. A system for monitoring a damage of a slewing ring bearing for a wind turbine, wherein the wind turbine includes a hub with a hub wall that defines an engagement region around an opening to an internal hub cavity, the slewing ring bearing mounted in the opening, the system comprising:
    at least one optical fiber sensor arranged on an outer surface of the engagement region of the hub wall radially outward of and adjacent the slewing ring bearing or to an inner surface of the engagement region of the hub wall within the hub cavity radially outward of and adjacent the slewing ring bearing; and
    a controller communicatively coupled to the at least one optical fiber sensor, the controller configured to perform a plurality of operations, the plurality of operations comprising:
    receiving one or more sensor signals from the at least one optical fiber sensor indicative of one or more changes associated with the slewing ring bearing or structure adjacent to the slewing ring bearing;
    comparing the one or more changes associated with the slewing ring bearing or the structure adjacent to the slewing ring bearing to a damage threshold; and
    implementing a control action when the one or more changes exceed the damage threshold to prevent or minimize further damage from occurring to the slewing ring bearing or the structure adjacent to the slewing ring bearing.

11. The system of claim 10, comprising a plurality of the optical fiber sensors circumferentially distributed adjacent the slewing ring bearing on the outer surface of the engagement region or on the inner surface of the engagement region.

12. The system of claim 10, wherein the controller is further configured to:
    compare signals from the at least one optical fiber sensors to evaluate damage occurring in the slewing ring bearing.

13. The system of claim 10, wherein the at least one optical fiber sensor is configured to generate a plurality of pulses and to reflect and transmit the plurality of pulses, and wherein the controller is further configured to analyze the reflected and transmitted plurality of pulses to produce the signals of the one or more changes associated with the slewing ring bearing or the structure adjacent to the slewing ring bearing.

14. The system of claim 13, wherein the controller is further configured to determine a frequency shift in the reflected and transmitted plurality of pulses.

15. The system of claim 10, wherein the at least one optical fiber sensor is a Fiber Bragg Grating fiber optic strand.

16. The system of claim 10, wherein the slewing ring bearing comprises one of a pitch bearing or a yaw bearing of the wind turbine.

* * * * *